(12) United States Patent
Huang et al.

(10) Patent No.: US 11,904,535 B2
(45) Date of Patent: Feb. 20, 2024

(54) HYBRID PART-ACCESSORY CONNECTIONS

(71) Applicant: Hewlett-Packard Development Company, L.P., Spring, TX (US)

(72) Inventors: Wei Huang, Palo Alto, CA (US); Patrick De Marcillac, Grenoble (FR); Gary J. Dispoto, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 46 days.

(21) Appl. No.: 17/415,334

(22) PCT Filed: May 13, 2020

(86) PCT No.: PCT/US2020/032652
§ 371 (c)(1),
(2) Date: Jun. 17, 2021

(87) PCT Pub. No.: WO2020/242761
PCT Pub. Date: Dec. 3, 2020

(65) Prior Publication Data
US 2022/0072770 A1    Mar. 10, 2022

(30) Foreign Application Priority Data
May 30, 2019   (EP) .................................. 19305696

(51) Int. Cl.
*B29C 64/165*   (2017.01)
*B29C 64/171*   (2017.01)
*B29C 64/393*   (2017.01)
*B29C 64/40*    (2017.01)
*B33Y 10/00*    (2015.01)
*B33Y 50/00*    (2015.01)

(52) U.S. Cl.
CPC .......... *B29C 64/165* (2017.08); *B29C 64/171* (2017.08); *B29C 64/393* (2017.08); *B29C 64/40* (2017.08); *B33Y 10/00* (2014.12); *B33Y 50/00* (2014.12)

(58) Field of Classification Search
None
See application file for complete search history.

(56) References Cited

U.S. PATENT DOCUMENTS

| 8,470,231 | B1 | 6/2013 | Dikovsky et al. |
| 10,137,634 | B2 | 11/2018 | Ruiz et al. |
| 2004/0081573 | A1 | 4/2004 | Newell |

(Continued)

FOREIGN PATENT DOCUMENTS

| CN | 1684790 A | 10/2005 |
| CN | 204770668 U | 11/2015 |

(Continued)

*Primary Examiner* — Jeffrey D Washville
(74) *Attorney, Agent, or Firm* — Shook, Hardy & Bacon L.L.P.

(57) ABSTRACT

A hybrid connection for connecting a first portion of a three-dimensional (3D) print design to a second portion of the 3D print design may include a cross-sectional pattern of fully-fused connections and under-fused connections that connect between the first portion of the 3D print design and the second portion of the 3D print design. Systems and methods are also described herein that facilitate designing 3D parts with hybrid connections and/or automatically replacing fully-fused connections with hybrid connections.

9 Claims, 9 Drawing Sheets

(56) References Cited

U.S. PATENT DOCUMENTS

| | | |
|---|---|---|
| 2009/0194224 A1 | 8/2009 | Jendrny |
| 2014/0308153 A1 | 10/2014 | Ljungblad |
| 2016/0107234 A1 | 4/2016 | Craeghs et al. |
| 2017/0259502 A1 | 9/2017 | Chapiro et al. |
| 2018/0117837 A1 | 5/2018 | Reese et al. |

FOREIGN PATENT DOCUMENTS

| | | | |
|---|---|---|---|
| DE | 102009023717 A1 | * | 12/2010 |
| DE | 102009023717 A1 | | 12/2010 |
| WO | WO-2015108546 A2 | | 7/2015 |
| WO | WO-2018151725 A1 | | 8/2018 |

* cited by examiner

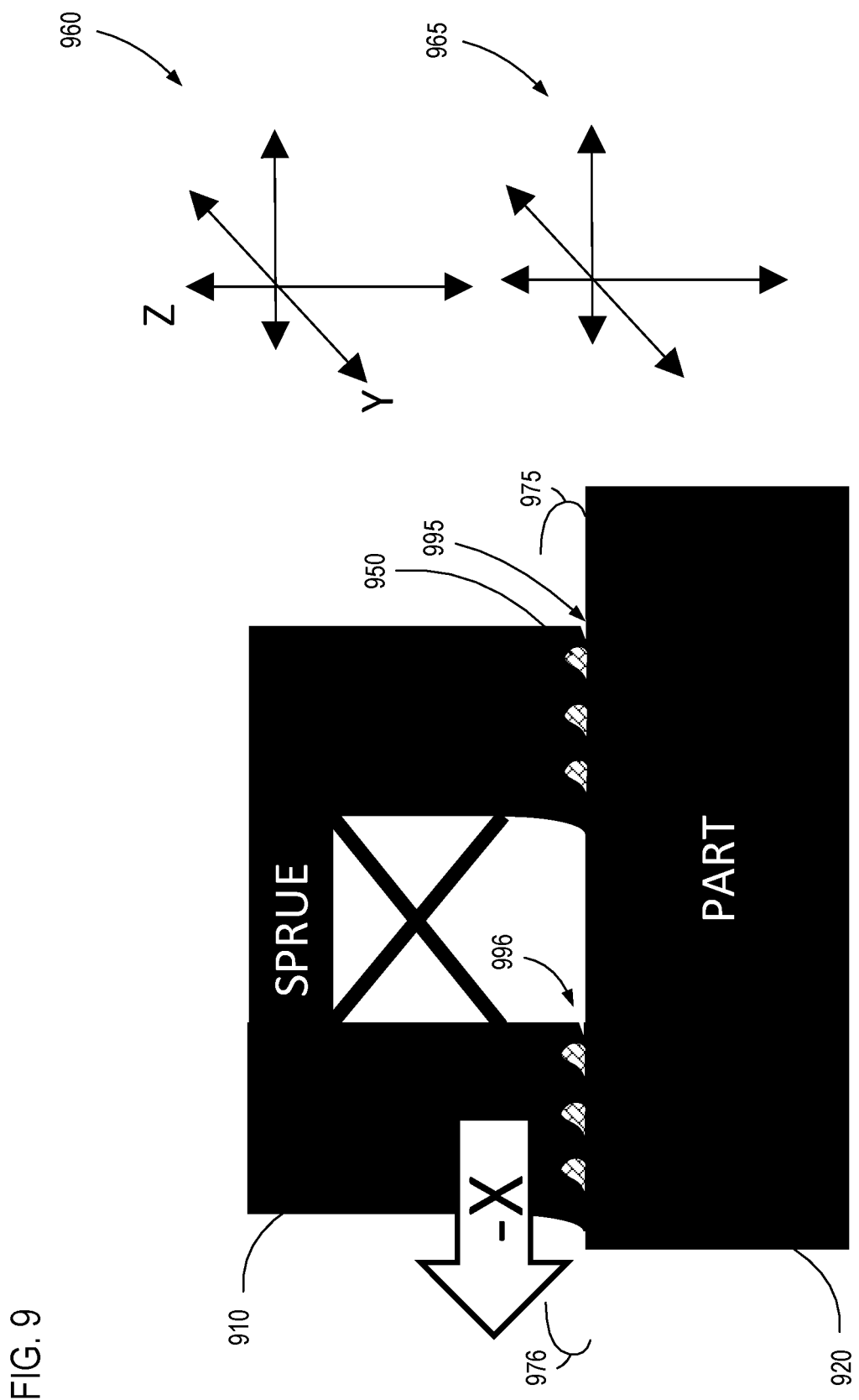

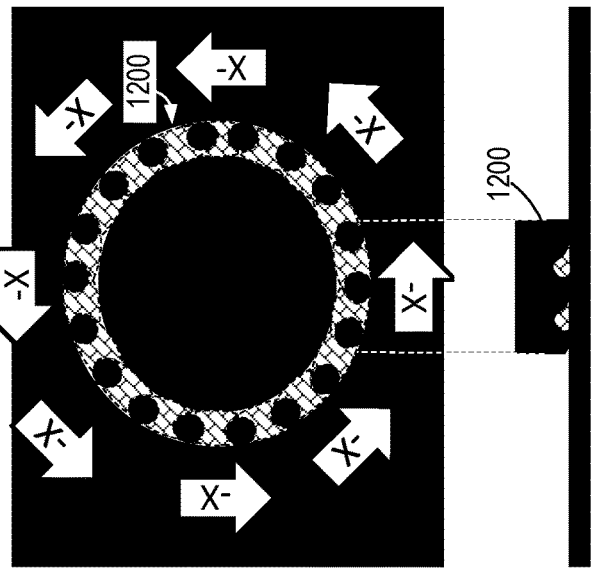
FIG. 12A
FIG. 12B
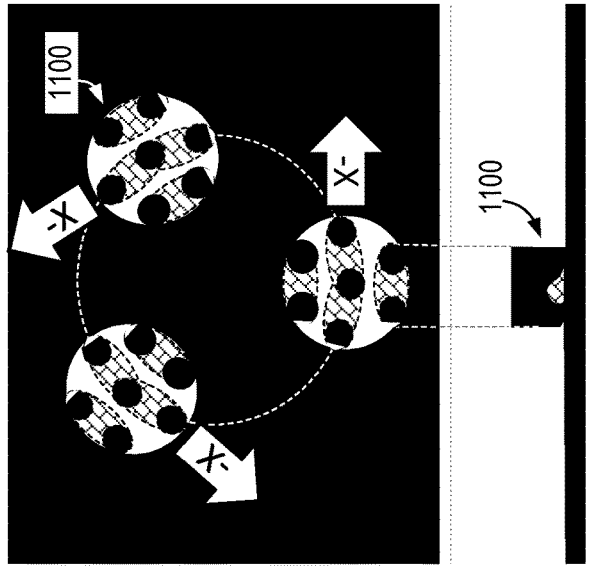
FIG. 11A
FIG. 11B
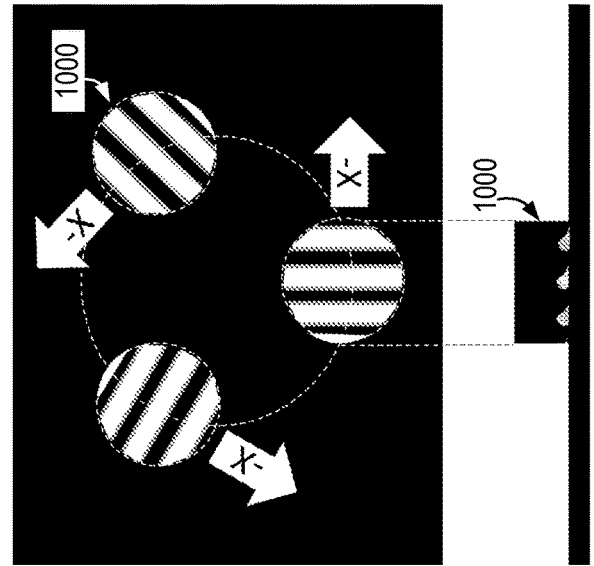
FIG. 10A
FIG. 10B

HYBRID PART-ACCESSORY CONNECTIONS

BACKGROUND

Multiple parts may be injected molded as a set of parts connected to a runner and/or sprue. Each individual part may be connected to the runner via a gate or another part-accessory connection. In injection molding, part-accessory connections are necessarily manufactured from the same solid material as the part itself. A fusion-based three-dimensional printer may print a set of parts connected to a runner and/or sprue. Gates or another part accessory connection connecting individual parts to the runner may be fully fused by the three-dimensional printer.

BRIEF DESCRIPTION OF THE DRAWINGS

Non-limiting and non-exhaustive examples of the disclosure are described, including various examples of the disclosure, with reference to the figures, in which:

FIG. 9 illustrates an example of a part connected to a sprue via dual hybrid connections designed for directional separation with mitigated moment effect.

FIG. 10A illustrates an example of a cross-sectional view of a directionally weak hybrid connection designed for counterclockwise weakness.

FIG. 10B illustrates a side profile of the directionally weak hybrid connection of FIG. 10A.

FIG. 11A illustrates another example of a cross-sectional view of a directionally weak hybrid connection designed for counterclockwise weakness.

FIG. 11B illustrates a side profile of the directionally weak hybrid connection of FIG. 11A.

FIG. 12A illustrates another example of a cross-sectional view of a directionally weak hybrid connection designed for counterclockwise weakness.

FIG. 12B illustrates a side profile of the directionally weak hybrid connection of FIG. 12A.

DETAILED DESCRIPTION

Figure 1:
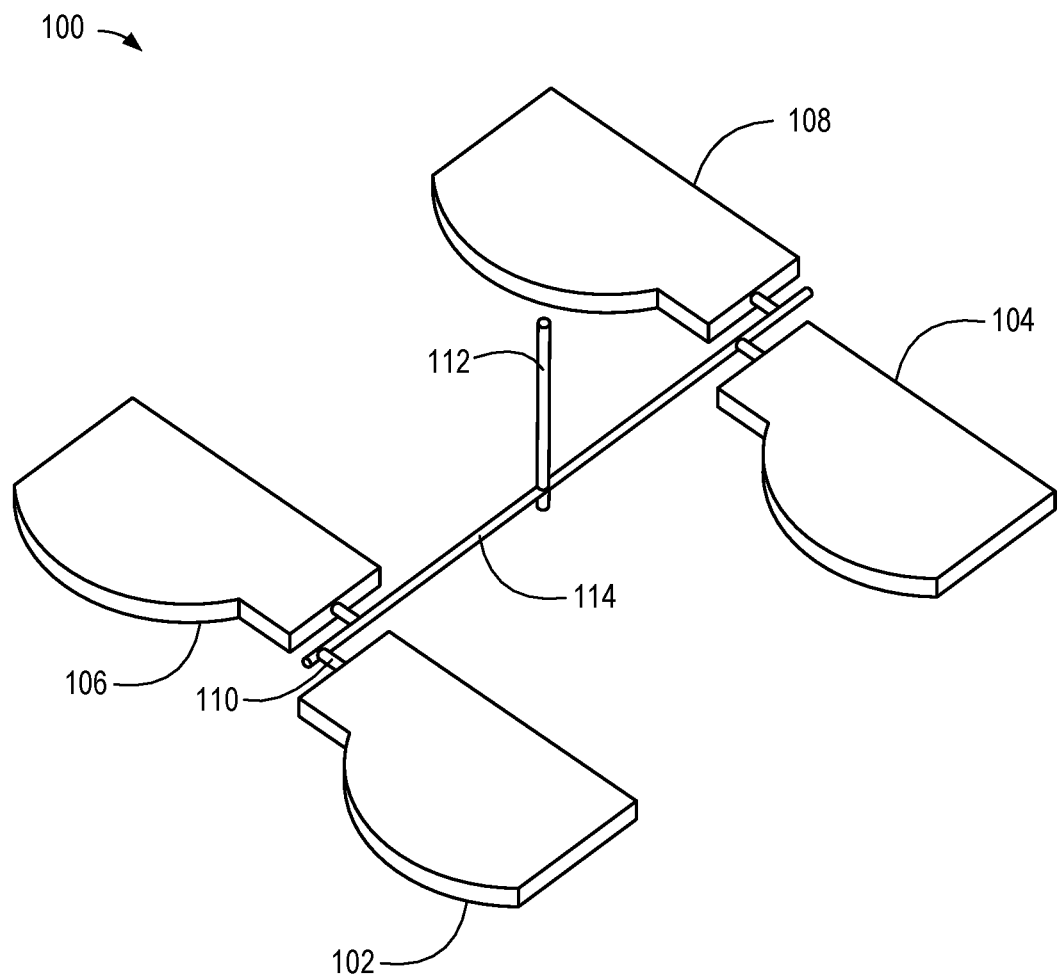
FIG. 1 illustrates a perspective view of an example of part-accessory connections connecting multiple parts to an accessory.

In three-dimensional (3D) printing, printing modern parts unit systems may incorporate printing a first part and a second part with a connection between the first part and the second part. The second part may be a useable part, and the two parts may be separated by breaking or removing the connection therebetween. In some instances, the second part may be an accessory, such as an accessory tree. Multiple parts may each be connected to the accessory via connections. An example of a connection is a "gate" that connects parts to an accessory. The accessory may include a runner, or a runner and sprue, for example. Throughout this disclosure, connections between a first part and a second part, including connections that connect parts to an accessory, another part or another portion of the same part, are referred to as part-accessory connections.

For example, a part-accessory connection that may allow multiple parts to be removed from a printing substance and cleaned as a single unit. That is, the accessory may be grasped and used to pick up multiple parts connected thereto via part-accessory connections. By lifting the part-accessory connection, the attached parts are transported along with the part-accessory connection. Removing the parts unit from the remaining printing substance and cleaning the parts as a single unit, the parts unit, decreases the number of potential and actual parts lost.

Additionally, removing and cleaning parts as a single unit increases the number of parts that may be cleaned during a defined period of time. When parts are 3D-printed utilizing a fully-fused part-accessory connection between the part and the accessory, residue from the connection remains on the part when the part is removed from the accessory. When parts are 3D-printed utilizing an under-fused part-accessory connection between the part and the accessory, the connection can be too weak. Parts connected utilizing an under-fused connection may become removed prematurely from the accessory, these parts may be lost or remain in the printing substance, disconnected during post-printing processes, and/or disconnected during shipping.

For example, a part and accessory may be lifted as a parts unit; if the connection is too weak, parts may accidentally be removed from the accessory. Further, a part may be accidentally removed from the part-accessory connection during the cleaning process. In some instances, the part may fall into the printing substance; the printing substance may be recycled for another printing job. Using the recycled printing substance with the part in it may ruin the printing job and/or the printer.

Hybrid connections, as described herein, provide enhanced functionality for connecting a part and an accessory that is strong and yet does not leave excessive residue on the part once the part is removed from the accessory (or from another part or another portion of the same part). A hybrid pattern connection between a first part and a second part may remain strong enough to keep the first part and the second part connected while decreasing residue left on one or both parts after removal. Decreased residue on a part improves fit, smoothness, assembly of parts, and movement of parts. For example, the decreased residue allows for faster or improved polishing, painting, or other finish work.

A 3D print design may include multiple parts, accessories, and/or other components. Each of these parts, accessories, or components may be considered a "portion" of the 3D print design. Similarly, each part in a 3D print design may comprise multiple portions, such as a top portion a side portion, etc. Thus, reference herein to a "portion" of a 3D print design may encompass a part or accessory of an overall 3D print design, or a section or region of a single part in a 3D print design. For example, a first portion of a 3D print design may be a part that is connected via a connector (e.g., a hybrid connection) to a second portion of the 3D print design that is an accessory. Alternatively, the first and second portions in the 3D print design may be sections of the same part. In yet another example, the first and second portions of the 3D print design may be two different parts in the same 3D print design.

In some examples, a hybrid connection includes an alternating pattern (a "hybrid pattern") of fully-fused and under-fused materials of a printing substance. In one example, the hybrid pattern may fully fuse the outside rim of the connection and under-fused the inside portion of the connection. In another example, the hybrid pattern may fully fuse the corners of the connection and under fuse the remaining portion of the connection. Accordingly, the hybrid pattern may comprise any of a wide variety of patterns of fully-fused and under-fused locations. For example, the hybrid pattern may comprise a cross-sectional pattern of fully-fused and under-fused connections between the first portion of the 3D print design and the second portion of the 3D print design. Fully-fused and under-fused may describe a variety of methods for 3D printing. For example, 3D binder jetting, multi jet fusion printing, selective laser sintering, and other powered based 3D printing systems. In 3D binder printing fully-fused and/or under-fused may describe the liquid binder agent disposed to join the powder particles. In selective laser sintering fully-fused and/or under fused may relate to the laser fusing the powder.

In powder-based 3D printing systems under-fused sections may be realized by, for example, utilizing a lower-than-normal fusing temperature, shortening the fusing time, and/or the like. A shorter fusing time produces under-fused sections by generating a porous microstructure, which results in reduced mechanical strength. A variation in temperature may strengthen or weaken the under-fused sections. For example, a lower fusing temperature may generate a weaker under-fused section whereas a higher fusing temperature may generate a stronger under-fused section. In multi jet fusion printing, the 3D printer may realize under-fused sections by incorporating gaps in the computer-aided design (CAD) file. That is, the CAD file may have gaps in the 3D print design where under-fused sections are to be printed. In multi jet fusion printing, under-fused sections may, for example, be realized by utilizing fewer fusing agents and/or adding more detailing agents. Fusing agents are applied to a material layer to fuse the particles together. Detailing agent is applied to modify fusing and create fine detail and smooth surfaces. Detailing agent is utilized for fine detail and may be weaker than fusing agents. The strength of the under-fused section may be selectively modified by varying the relative quantities of fusing agent and detailing agent. For example, an under-fused section with more fusing agent than detailing agent may stronger than an under-fused section with more detailing agent than fusing agent.

In some example, software for designing 3D print designs and/or software within a 3D printer may identify connections (e.g., gates) between parts and an accessory (e.g., a runner or runner-and-sprue). The software may identify these connections as fully-fused connections that are likely to or will possibly leave a residue on the part when the part is disconnected from the accessory. The software may replace the fully-fused, standard connection with a hybrid connection. The hybrid connection may be configured with a cross-sectional pattern of fully-fused and hybrid-fused material portions extending between the part and the accessory. The pattern selected, overall dimensions of the hybrid connection and the relative dimensions of the fully-fused and under-fused portions may be selected to match the connection strength of the original fully-fused, standard connection while reducing or eliminating residue. In some examples, the hybrid connection may be selected to provide more strength or less strength than the original, fully-fused connection.

The examples of the disclosure may be further understood by reference to the drawings, wherein like parts are designated by like numerals throughout. It will be readily understood that the components of the disclosed examples, as generally described and illustrated in the figures herein, could be arranged and designed in a wide variety of different configurations. Thus, the following detailed description of the examples of the systems and methods of the disclosure is not intended to limit the scope of the disclosure, as claimed, but is merely representative of possible examples of the disclosure. In addition, the steps of a method do not necessarily need to be executed in any specific order, or even sequentially, nor need the steps to be executed only once, unless otherwise specified.

In some cases, well-known features, structures, or operations are not shown or described in detail. Furthermore, the described features, structures, or operations may be combined in any suitable manner in one or more examples. It will also be readily understood that the components of the examples as generally described and illustrated in the figures herein could be arranged and designed in a wide variety of different configurations.

Several aspects of the examples described may be implemented as software modules or components. As used herein, a software module or component may include any type of computer instruction or computer-executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain examples, a particular software module or component may comprise disparate instructions stored in different locations of a memory device, which together implement the described functionality of the module. Indeed, a module or component may comprise a single instruction or many instructions and may be distributed over several different code segments, among different programs, and across several memory devices. Some examples may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Examples may be provided as a computer program product, including a non-transitory computer and/or machine-readable medium having stored thereon instructions that may be used to program a computer (or another electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor-executable instructions.

FIG. 1 illustrates a perspective view of an example parts unit 100 comprising parts 102, 104, 106, and 108 connected via part-accessory connections (e.g., a gate 110) to an accessory 112 and 114. The parts unit 100 may be printed utilizing a three-dimensional (3D) powder-based printing process. In some examples, selective laser sintering is utilized. In some examples, multi jet fusion printing is utilized and the terms fully-fused and under-fused relate to the fusing of print material. In other examples, 3D binder jetting is utilized and the terms fully-fused and under-fused, as used herein, encompass analogous "fully-glued" and "weakly-glued" print processes for generating a hybrid connection.

The parts unit 100 may be printed based on a print design. The print design instructs the printer on the design of the print job. For example, the print design may describe the parts unit 100 to be printed with a first part connected directly to a second part. In some examples, as illustrated, each part 102, 104, 106, and 108 may be printed with a part-accessory connection connecting each respective part to an accessory. The accessory, as illustrated, includes a sprue 112, and a runner 114. In some examples, the parts 102, 104, 106, and 108 are the same type of part. In other examples, the parts may be different types of parts connected to a common accessory via the same size accessory-connection or different size accessory-connections. The parts 102, 104, 106, and 108 may be automotive components, surgical devices, bottle caps, toys, prototypes and/or other parts. A user may select a fully-fused connection between a part 102 and the runner 114. In such an example, the gate 110 is fully fused to the part 102 on one end and fully fused to the runner 114 on the other end.

In another example, a user may select a hybrid connection to connect the part 102 to the runner 114. The hybrid connection may completely replace the gate 110, such that a hybrid cross-sectional pattern of fully-fused and partially-fused portions of material connect between the part 102 and the runner 114. Alternatively, a smaller hybrid connection may form the connection between the part 102 and the gate 110, where the remaining portion of the gate 110 extending back to the runner 114 remains fully fused.

In other embodiments, the user may simply specify a breakable or removable connection for connecting a part 102 to the accessory (e.g., runner 114 and sprue 112). A software module (e.g., in the 3D part design software, print drivers to send a 3D part to a printer, and/or in the printer itself) may automatically determine a hybrid pattern to connect the part 102 to a gate 110 or directly connect the part 102 to the runner 114.

The hybrid pattern may be a cross-sectional pattern of fully-fused and under-fused connections between the first portion of the 3D print design and the second portion of the 3D print design. In some examples, the cross-sectional pattern comprises a matrix of alternating rectangles of fully-fused connections and under-fused connections between the first and the second portions of the 3D print design. In some examples, the cross-sectional pattern comprises a pattern of alternating polygons of fully-fused connections and under-fused connections between the first and the second portions of the 3D print design. In some examples, the hybrid pattern may be pre-loaded. In some examples, the hybrid pattern may be a custom design. In some examples, the user may select from pre-load hybrid patterns or an option to create a custom hybrid pattern. In this example, the hybrid pattern connection between the part and the part-accessory connection allows the connection to remain strong but leave decreased amounts or no residue on part 102 once the gate 110 is removed from part 102.

The 3D printer may include a user input, a laser, and a processor. The user input may allow the user to select a hybrid pattern choice. In some examples, the user may utilize the user input to select a customized option for the hybrid pattern. The customized option of the hybrid pattern may allow the user to create their own hybrid pattern. The printer may include one or more lasers to fuse the printing substance. The parts 102, 104, 106, and 10-8 and the accessory portions, including the runner 114 and the sprue 112, may be fully fused. In some examples, the printer may fully fuse the gate 110 to the runner 114. The printer may generate a hybrid connection between the gate 110 and the part 102 (and between the other gates and parts 104, 106, and 108). In other examples, the printer may replace the entire gate 110 with a hybrid connection having a cross-sectional pattern of fully-fused and partially-fused portions of the material extending between the part 102 and the runner 114.

The printer may generate the partially-fused portions by using fewer lasers to fuse the under-fused portions of the hybrid connection, reducing the power of one or more lasers used to fuse the under-fused portions of the hybrid connection, and/or reducing the amount of time one or more lasers are used to fuse the under-fused portions of the hybrid connection.

Figure 2A:
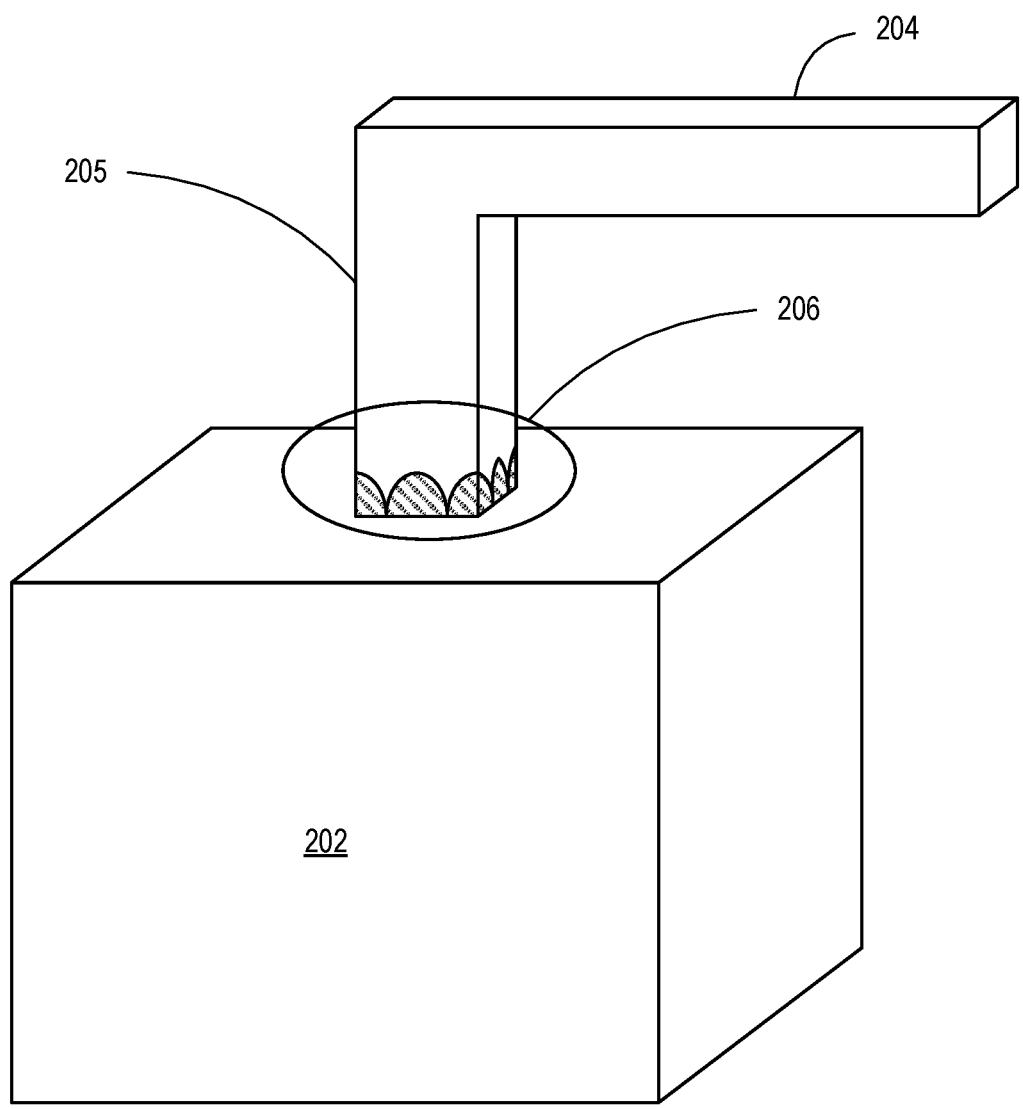
FIG. 2A illustrates a perspective view of an example of a part-accessory connection connected to a part.

FIG. 2A illustrates a perspective view of an example hybrid connection 206 of a part-accessory connection (e.g., gate 205) connecting a part 202 to a runner 204. In the illustrated example, the hybrid connection 206 has a relatively small thickness to connect the part 202 to the gate 205.

Figure 2B:
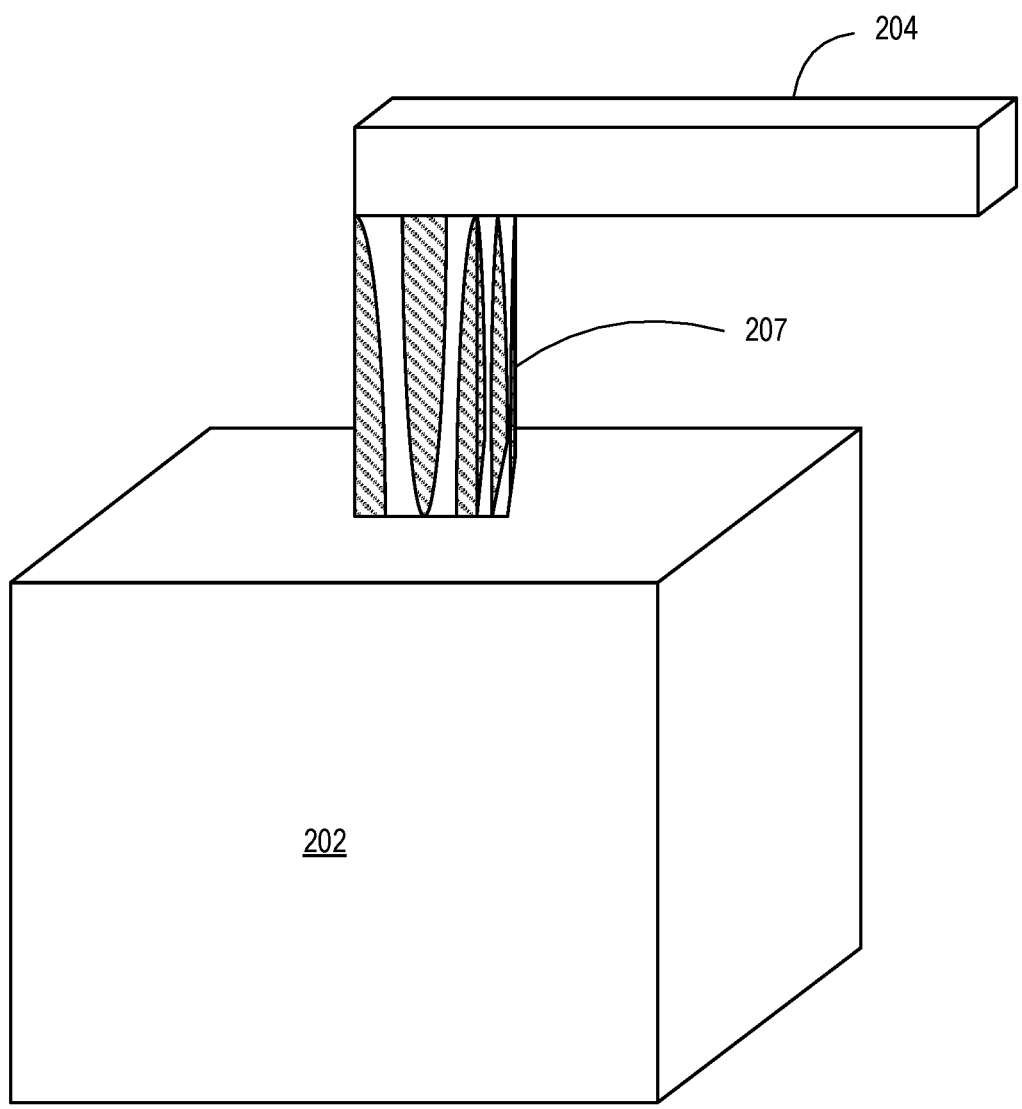
FIG. 2B illustrates a perspective view of another example of a part-accessory connection connected to a part.

FIG. 2B illustrates an alternative example in which a hybrid connection 207 extends between the part 202 and the runner 204. While this example, and many of the other examples described herein, describe a part connected to a runner 204, sprue or another accessory, it is appreciated that removable or breakable connections may be connected to other parts and other printed components, such as gates, frames, tags, etc.

In some examples, the hybrid connection 207 may be a cross-sectional pattern comprising an under-fused connection between the first and second portions of the 3D print design having a first cross-sectional area and a plurality of fully-fused connections between the first and second portions of the 3D print designs within the first cross-sectional area. In other examples, the under-fused connection between the first and the second portions of the 3D print design may be a circular cross-sectional area having a first diameter and each of the plurality of fully-fused connections between the first and second portions of the 3D design have circular cross-sectional areas having second diameters that are smaller than the first diameter.

A three-dimensional (3D) printer may print the hybrid connection 206 of FIG. 2A or 207 of FIG. 2B based on a user-defined hybrid pattern selection. The 3D printer may print the parts, the part-accessory connection, and the connection 206 once the printing job is received. The system may provide a graphical user interface enabling a user to select between various hybrid patterns. In some examples, the hybrid pattern selection may be sent separately from the remainder of the printing job. The 3D printer may instruct a laser connected to the 3D printer to fuse a printing substance. The laser may fuse the printing substance based on the selected hybrid pattern. The laser may additionally fuse the printing substance based on the remainder of the print design. In some examples, the laser may be a sinter laser. In some examples, the printing substance may be powdered nylon, another plastic, a metal, or another fusible material. Once the laser completes the print, the parts unit may be removed from the powdered nylon. The hybrid pattern connection 206 or 207 connected to the part 202 allows the parts unit to be cleaned, post-print processed, and/or shipped without, or without at least substantially, increasing the risk that the number of parts remaining attached to an accessory will decrease, as compared to a normal, fully-fused connection. Under-fused connections generally increase the risk that parts will become detached during post-printing processes, or even during removal from the 3D printer. Fully-fused connections cannot be easily removed from the part without leaving residue, such as a spur or divot in the part.

Figure 3:
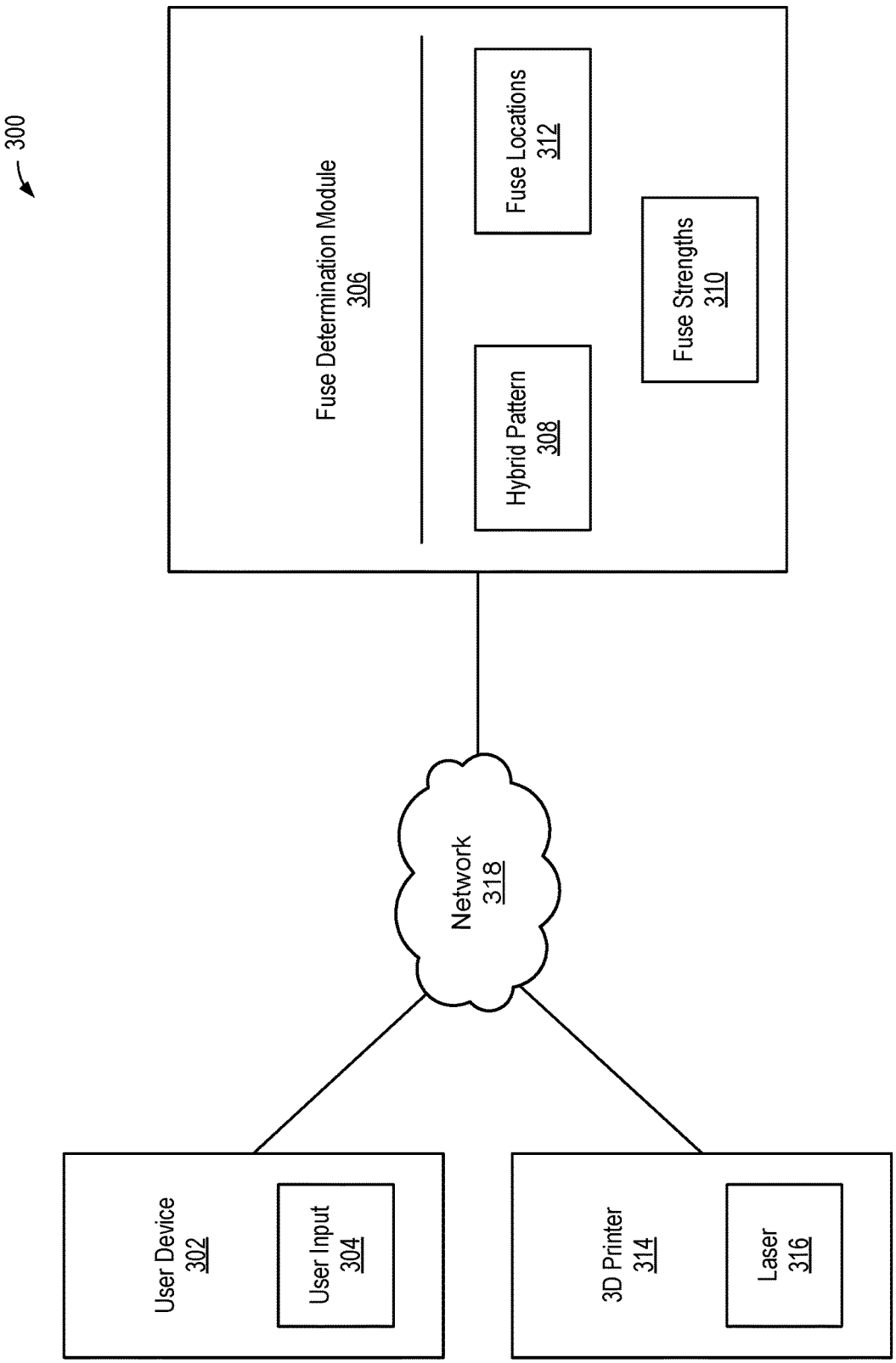
FIG. 3 illustrates a block diagram of an example of a fuse determination system.

FIG. 3 illustrates a block diagram of a fuse determination system 300. The fuse determination system 300 may determine the type of hybrid pattern, a strength value, and a location. In some examples, the fuse determination system 300 may include a user device 302, a three-dimensional (3D) printer 314, a communication network 318, and an independent fuse determination module 306. In some examples, the 3D printer 314 may also be the user device 302. For example, the user may interact with a user device 302 integrated as part of the 3D printer with a touchscreen user input 304.

In some examples, the user device 302 may be physically connected to the 3D printer 314. In some examples, the user device 302 may be remotely connected to the 3D printer 314. In some examples, the fuse determination system 300 may include a processor and a non-transitory computer-readable medium. The non-transitory computer readable medium may have instructions stored thereon that may be implemented by a processor. In some examples, the 3D print design may be developed with the hybrid connection. Alternatively, the hybrid connection may replace the connection in a 3D print design.

In some examples, the user device 302 may comprise a user input 304 for a user to select a hybrid pattern. The user device 302 may send a selected hybrid pattern 308 to the fuse determination module 306 or directly to the 3D printer 314. In some examples, the user may select to create a custom pattern of fully-fused and under-fused connections defining the cross-sectional pattern of the hybrid connection. In some examples, the cross-sectional pattern comprises a matrix of alternating rectangles of fully-fused connections and under-fused connections between the first and the second parts for 3D printing.

The fuse determination module 306 may analyze a 3D print design provided by the user device 302 or the 3D printer to identify a fully-fused connection between a first part and the second part. The fuse determination module 306 may replace the fully-fused connection with a hybrid connection and determine each location of the connection to be fully-fused and each location to be under-fused. In some examples, the identified part-accessory connection comprises a fully-fused part-accessory connection with a first cross-sectional area, and wherein each fully-fused connection of the hybrid connection has a smaller cross-sectional area than the first cross-sectional area. In some examples, the fuse determination module 306 utilizes the multi-part design to determine each location to fully-fuse and under-fuse the connection. In some examples, fusing locations 312 stores the location determinations.

In some examples, the fuse determination module 306 determines strength values. The strength value of the part-accessory connection is identified, and a hybrid connection cross-sectional pattern of fully-fused and under-fused connections is selected. The selected hybrid connection may approximate the identified strength value. For example, the hybrid pattern 308 selected may call for six locations to be under-fused, three of the under-fused locations may be determined to be more fused than the other three under-fused locations. Further, a first hybrid pattern may call for stronger under fuse values and a second hybrid pattern may call for weaker under fuse values. In some examples, the identified part-accessory connection comprises an under-fused part-accessory connection with a first cross-sectional area wherein a cross-sectional area of the hybrid connection is smaller than the first cross-sectional area. In some examples, the identified part-accessory connection comprises an under-fused part-accessory connection wherein a strength value of the hybrid connection is greater than the strength value of the identified part-accessory connection and has a cross-sectional area no greater than a cross-sectional area of the identified under-fused part-accessory connection. In some examples, strength may be controlled by degree of powder, gap size, amount of detailing agent, printing orientation, or other types of strength controlling. In some examples, the area of the fully-fused and/or under-fused section may determine strength. For example, if the cross-section is comprised of small section the connection may stronger. In some examples, fuse strengths 310 stores the strength values.

In some examples, more than one parts unit may be printed. In some examples, the hybrid pattern 308 for the connection may be the same for each parts unit. In some examples, more than one hybrid pattern 308 may be selected for each parts unit. For example, there may be multiple parts units being printing during one print job; each parts unit may comprise a different hybrid pattern 308 connection. In some examples, the fuse determination module 306 may determine the fully-fused locations and under-fused locations of the connection alone. In some examples, the fuse determination module 306 may determine the fully-fused and under-fused locations and strengths of the connection alone. In some examples, the fuse determination module 306 may determine the location and strength of each portion to be printed, for example, the parts, the part-accessory connection, and the connection. In some examples, the fuse determination module 306 may determine a strength for each location to be fused.

The fuse determination module 306 may send fuse locations 312 to the 3D printer 314. Fuse locations 312 may comprise each fully-fused location of the connection, each under-fused location of the connection, each location of each part, and each location of each part-accessory connection. In some examples, the fuse locations 312 may comprise a selection of these. In some examples, the fuse locations 312 may comprise more locations. In some examples, the fuse determination module 306 may send the fuse strengths 310 to the 3D printer 314. Fuse strengths 310 may comprise the strength of each fused location. In some examples, the fuse determination module 306 is at the user device 302. In some examples, the fuse determination module 306 is at the 3D printer 314. The 3D printer may comprise a laser 316 to fuse a printing substance. In some examples, the laser 316 is a sinter laser. In some examples, the printing substance is a powder. In some examples, the printing substance is a nylon powder. In some examples, the 3D printer may print the parts, the part-accessory connection, and the connection between the part and the part-accessory connection.

Figure 4:
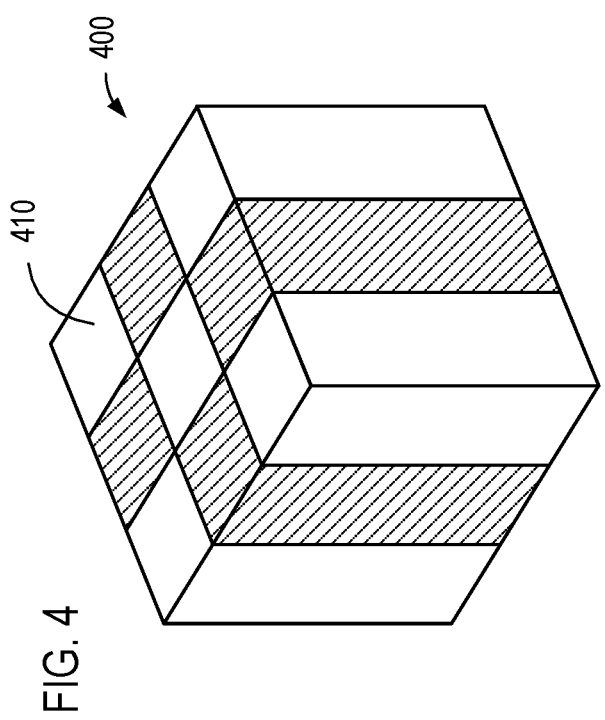
FIG. 4 illustrates a first example of a hybrid connection with a pattern of fully-fused and under-fused materials to connect a part and an accessory.

FIG. 4 illustrates a first example of a hybrid connection 400 with a cross-sectional pattern 410 of fully-fused and under-fused materials to connect a part and an accessory. The hybrid pattern 410 shown alternates between fully-fused square locations and under-fused square locations. A user may, for example, select this hybrid pattern 410 via user input. For instance, the user may select the hybrid pattern from pre-loaded patterns. The pre-loaded patterns may be patterns that are loaded at creation. In some examples, the pre-loaded patterns may be patterns that are created by the user and saved. In some examples, the user may select to create a custom hybrid pattern. In some examples, the custom hybrid pattern may start with a pre-loaded pattern, that pre-loaded pattern may be altered to create a custom hybrid pattern. For example, a user may modify a pre-loaded pattern to decrease the percentage of material that is fully-fused to decrease or fully eliminate the residue once the hybrid connection is removed from the part. Alternatively, the user may increase the percentage of material that is fully-fused to increase the connection strength, while still reducing or eliminating residue once the hybrid connection is removed from the part.

Figure 5:
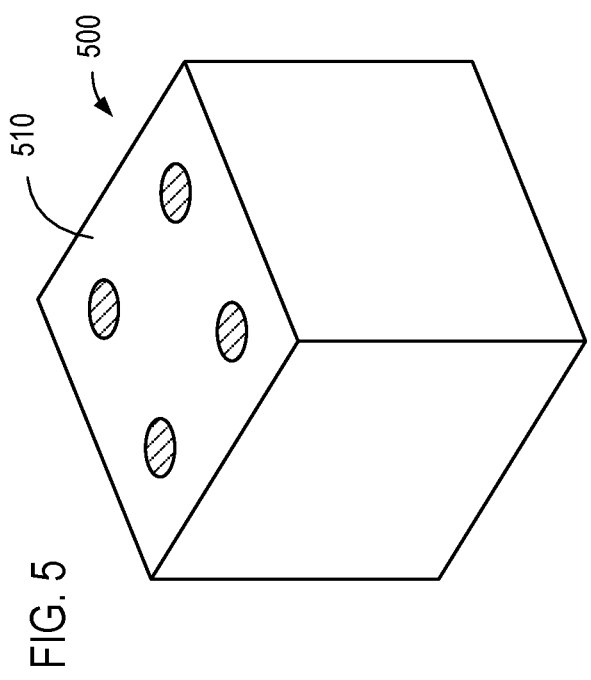
FIG. 5 illustrates a second example of a hybrid connection with a different pattern of fully-fused and under-fused materials to connect a part and an accessory.

FIG. 5 illustrates a second example of a hybrid connection 500 with another cross-sectional pattern 510 of fully-fused and under-fused materials to connect a part to an accessory. The illustrated example includes four fully-fused cylinders within a rectangular prism of under-fused material. As can be readily appreciated, the under-fused portions of the rectangular prism are easily disconnected or removed from a part, while the ends of the fully-fused cylinders provide a stronger connection and reinforce the hybrid connection 500 to provide sufficient strength and/or rigidity for a particular part-accessory connection.

Figure 6:
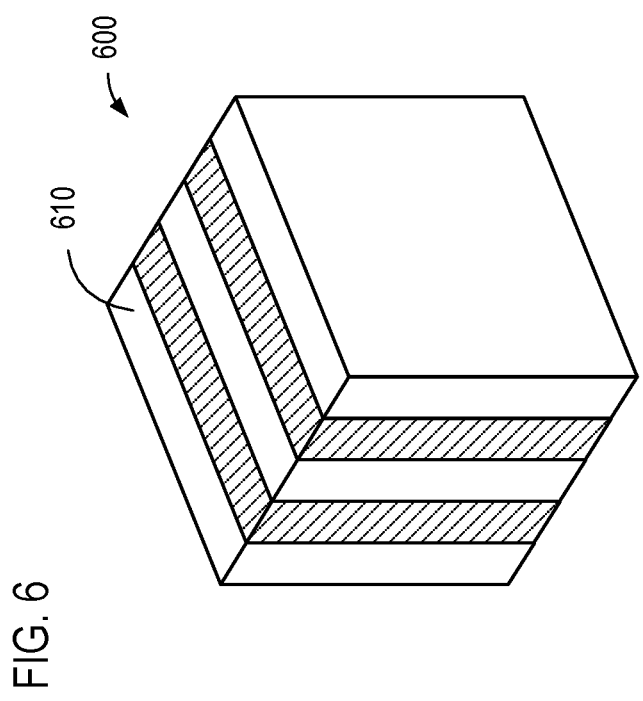
FIG. 6 illustrates a third example of a hybrid connection with another pattern of fully-fused and under-fused materials to connect a part and an accessory.

FIG. 6 illustrates a third example of a hybrid connection 600 with another cross-sectional pattern 610 of fully-fused and under-fused materials formed in layers to connect a part and an accessory. The number of layers and thickness of each layer may be varied to achieve a target connection strength and residue minimization/elimination.

Figure 7:
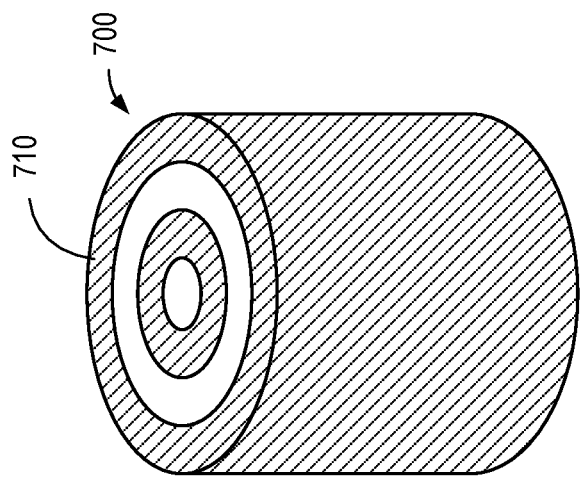
FIG. 7 illustrates a fourth example of a hybrid connection with another pattern of fully-fused and under-fused materials to connect a part and an accessory.

FIG. 7 illustrates a fourth example of a hybrid connection 700 with another cross-sectional pattern 710 of fully-fused and under-fused materials to connect a part and an accessory. In the illustrated embodiments, the fully-fused and under-fused are arranged in alternating concentric rings. The number of rings, the thickness of the rings, and the relative thickness of the under-fused rings and fully-fused rings may be adjusted to attain a target connection strength and residue minimization/elimination.

Figure 8B:
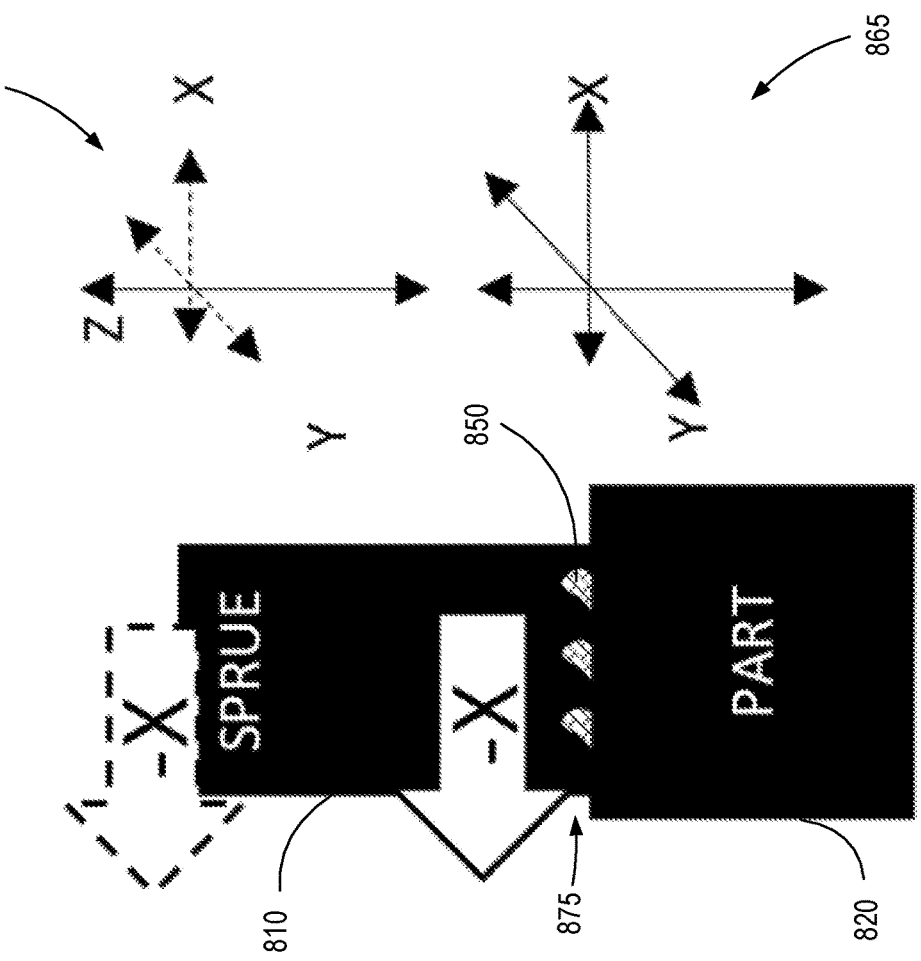
FIG. 8B illustrates an example of a part and an elongated sprue connected via a directionally weak hybrid connection.
Figure 8A:
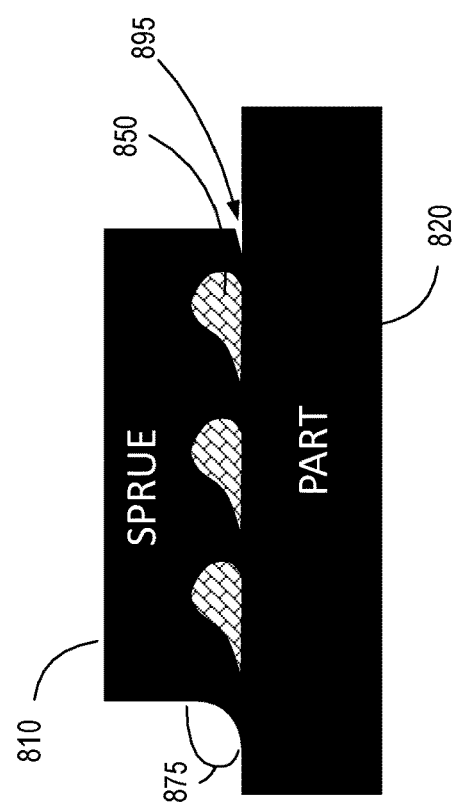
FIG. 8A illustrates an example of a part and a sprue connected via a directionally weak hybrid connection.

FIG. 8A illustrates an example of a part 820 and a sprue 810 connected via a directionally weak hybrid connection 875 comprising multiple under-fused connections 850 within a surrounding fully-fused material. The angular profile of the under-fused connections 850 in one direction facilitates propagation of tearing the connection from right to left to remove the part 820 from the sprue 810.

The rounded end of the under-fused connections provides increased resistance to tearing in the other directions. The 3D print design may include a wedge shape cavity 895 to seed a start for right to left tearing of the connection to separate the part from 820 from the sprue 810. The reduced contact area of fully-fused material of the connection between the sprue 810 and the part 820 reduces scaring and/or residual material. As illustrated and previously described, in many examples the hybrid connection may be formed as part of the end of an accessory (e.g., have the same cross-sectional dimensions as sprue 810) or be a separate section with different dimensions than either the sprue 810 or part 820.

FIG. 8B illustrates an example of a part 820 and an elongated sprue 810 connected via a directionally weak hybrid connection 850 similar that described in FIG. 8A. The illustrated example, the right to left tearing is shown as being in the −X direction relative to the three-axis coordinate systems 860 and 865. The length of the sprue 810 illustrates that that further away from the directionally weak hybrid connection, the greater the moment and the weaker the directionally weak hybrid connection is. The three-axis coordinate systems 860 and 865 illustrate the force vectors in each direction required to separate the part 820 from the sprue 810 by tearing the connection 875.

The solid −X closest to the directionally weak hybrid connection 875 corresponds to the lower three-axis coordinate system 865. The dashed −X furthest from the directionally weak hybrid connection 875 corresponds to the upper three-axis coordinate system 865. As illustrated, leveraged force applied furthest from the directionally weak hybrid connection 875 requires less force in both the positive and negative X and Y directions.

FIG. 9 illustrates an example of a part 920 connected to a sprue 910 via dual hybrid connections 975 and 976 that each include multiple under-fused connection within the fully-fused material. Each of the dual hybrid connections 975 and 976 is configured to be directionally weak with a tear start wedge 995 and 996 to allow for tearing of the connection from right to left. The illustrated dual connection minimizes the effect of the leveraged moment effect illustrated and described in conjunction with FIG. 8B. Specifically, the force vectors shown in the three-axis coordinate systems 960 and 965 illustrate that a similar or identical force is required to separate the part 920 from the sprue 910, regardless of whether the force is applied near the dual hybrid connections 975 and 976 or near the top of the sprue 910.

FIG. 10A illustrates an example of a cross-sectional view of a directionally weak hybrid connection designed for counterclockwise weakness. In the illustrated embodiment, each of the three under-fused connections 1000 within the fully-fused material of the connection is oriented to be directionally weak in the −X direction. Accordingly, counterclockwise rotation of the connection requires less force to tear the connection than would be required via lateral force or clockwise rotation.

FIG. 10B illustrates a side profile of one portion (defined by the connecting dashed lines) of the directionally weak hybrid connection of FIG. 10A showing the under-fused connections 1000. Comparing FIGS. 10A and 10B, it can be seen that the example under-fused connections 1000 are elongated section of under-fused material arranged in rows with opposing angled portions and rounded portions oriented in the −X direction.

FIG. 11A illustrates another example of a cross-sectional view of a directionally weak hybrid connection designed for counterclockwise weakness.

FIG. 11B illustrates a side profile of one portion (defined by the connecting dashed lines) of the directionally weak hybrid connection of FIG. 11A. Comparing FIGS. 11A and 11B, it can be seen that each hybrid connection includes portions of under-fused material and fully-fused material with angles portions and rounded portions oriented in the −X direction.

FIG. 12A illustrates another example of a cross-sectional view of a directionally weak hybrid connection designed for counterclockwise weakness.

FIG. 12B illustrates a side profile of one portion (defined by the connecting dashed lines) of the directionally weak hybrid connection of FIG. 12A. Comparing FIGS. 12A and 12B, it can be seen that the hybrid connection comprises alternating portions of under-fused material and fully-fused material, where the under-fused material includes angles portions and rounded portions oriented in the counterclockwise −X direction.

While specific examples and applications of the systems and methods described herein are illustrated and described in detail, the disclosure is not limited to the precise configurations and components as described. Many changes may be made to the details of the above-described examples without departing from the underlying principles of this disclosure. The scope of the present disclosure should, therefore, be understood to encompass at least the following claims.

What is claimed is:

1. A hybrid connection for connecting a first portion of a three-dimensional (3D) print design to a second portion of the 3D print design, the hybrid connection comprising:
   a cross-sectional pattern for printing using a printing material, the cross-sectional pattern comprises fully-fused connections and under-fused connections, the cross-sectional pattern being positioned between the first portion of the 3D print design and the second portion of the 3D print design;
   wherein the under-fused connections have reduced mechanical strength relative to the fully-fused connections.

2. The hybrid connection of claim 1, wherein the cross-sectional pattern comprises a matrix of alternating rectangles of fully-fused connections and under-fused connections between the first and second portions of the 3D print design.

3. The hybrid connection of claim 1, wherein the cross-sectional pattern comprises a pattern of alternating polygons of fully-fused connections and under-fused connections between the first and second portions of the 3D print design.

4. The hybrid connection of claim 1, wherein the cross-sectional pattern comprises:
   an under-fused connection between the first and second portions of the 3D print design having a first cross-sectional area; and
   a fully-fused connection between the first and second portions of the 3D print design within the first cross-sectional area.

5. The hybrid connection of claim 1, wherein the cross-sectional pattern comprises:
   an under-fused connection between the first and second portions of the 3D print design having a first cross-sectional area; and
   a plurality of fully-fused connections between the first and second portions of the 3D print design within the first cross-sectional area.

6. The hybrid connection of claim 4, wherein the under-fused connection between the first and second portions of the 3D print design has a circular cross-sectional area having a first diameter; and the fully-fused connection between the first and second portions of the 3D print design have circular cross-sectional areas having second diameters that are smaller than the first diameter.

7. The hybrid connection of claim 1, wherein the under-fused connection includes a porous microstructure.

8. The hybrid connection of claim 1, wherein the printing material of the under-fused connection includes less of a fusing agent than in the fully-fused connection.

9. The hybrid connection of claim 1, wherein a strength of the under-fused connection is adjusted by adjusting an amount of a fusing agent delivered to the printing material relative to the fully-fused connection.

* * * * *